Patented May 20, 1952

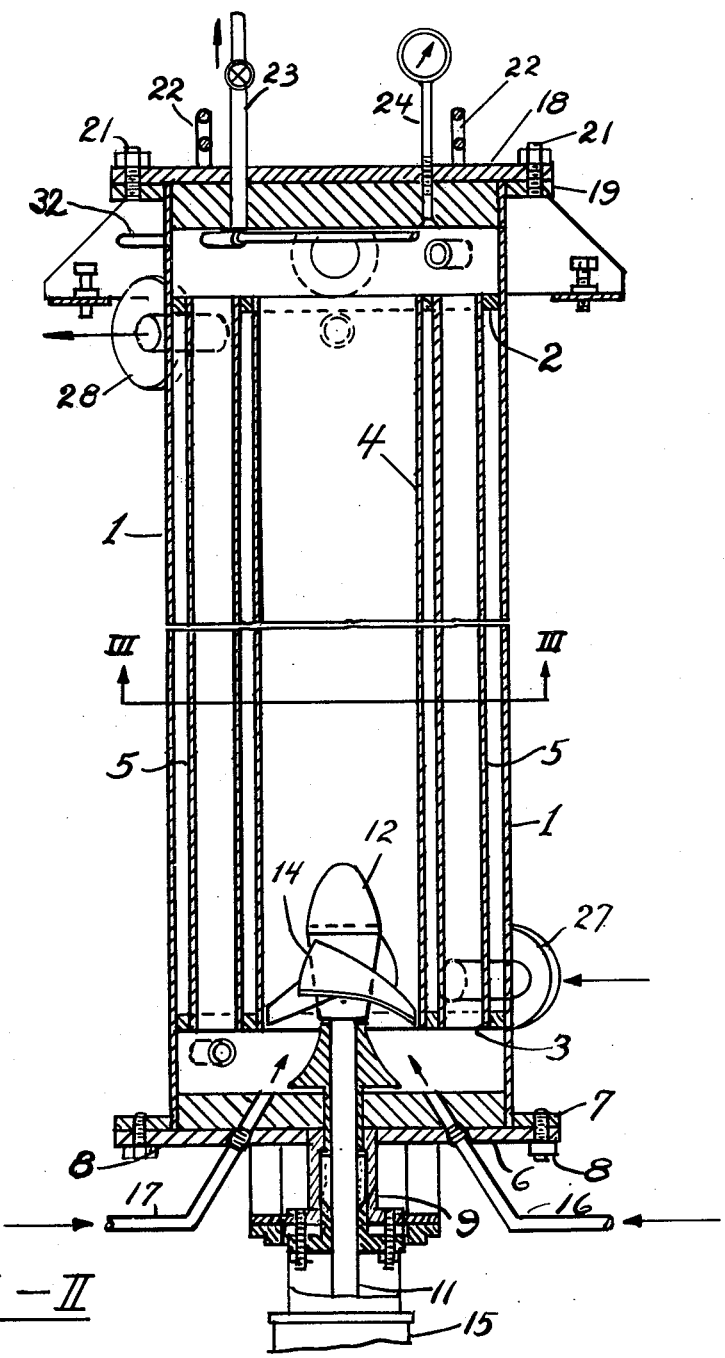
FIG.-II

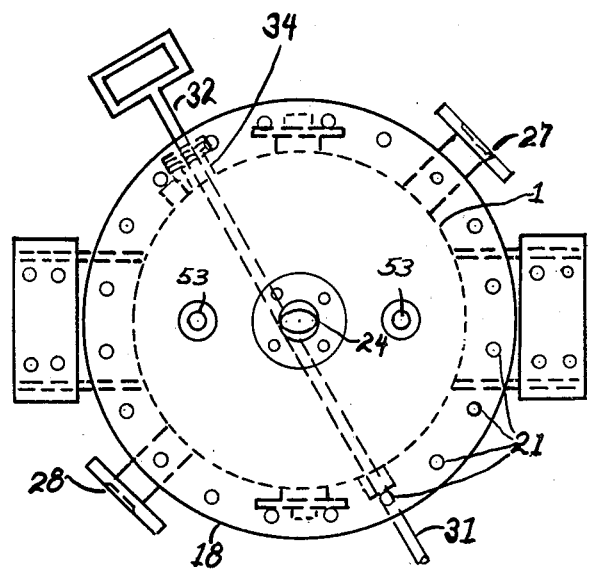
*FIG.—IV*
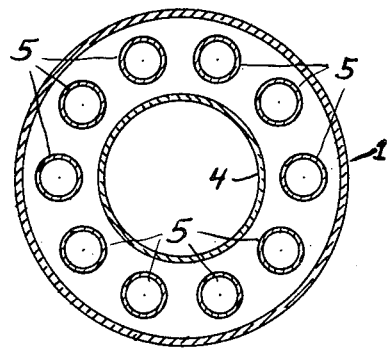
*FIG.—III*
John H Bannon Inventor
By W. H. Smyers Attorney

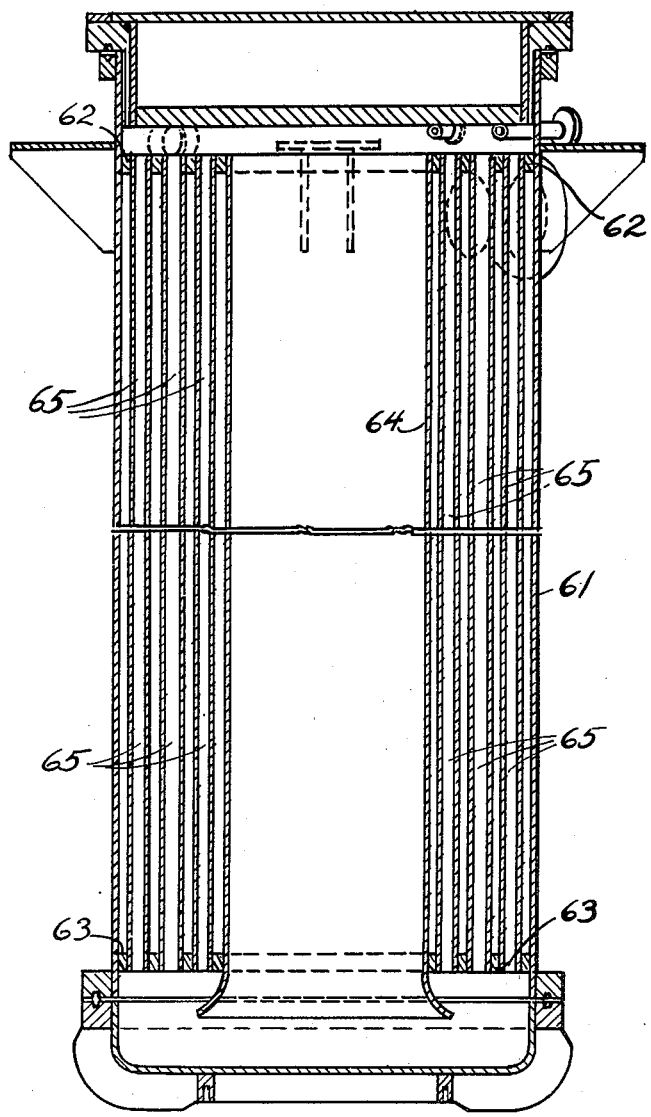
FIG.-V
John H. Bannon Inventor
By W. H. Smyers Attorney

2,596,975

UNITED STATES PATENT OFFICE 2,596,975

SLURRY POLYMERIZATION PROCESS

John H. Bannon, Cranford, N. J., assignor to Standard Oil Development Company, a corporation of Delaware Application September 1, 1949, Serial No. 113,583

7 Claims. (Cl. 260—85.3)

This invention relates to processes for the manufacture of olefinic polymers, relates particularly to low temperature, continuous polymerization processes for olefinic materials, and relates especially to a continuous polymerization process for mixed olefins operating at temperatures within the range between —40° and —110° C., with rapid circulation, turbulence and rapid heat transfer to remove the heat of polymerization, and reduce the amount of reactor fouling from adherent polymer.

It has been found possible to polymerize a number of olefins, especially the isoolefins, of which isobutylene is preferred, at temperatures ranging from 0° C. to —110° C., or lower, to such temperatures as —127° C. or —136° C., or even —164° C., although the preferred temperature range for producing an elastomer or other high polymer is between —40° C. and —110° C., with isobutylene in the presence of a multiolefin such as butadiene, or any of the substituted butadienes, or multiolefins; by the application to the olefinic material of a Friedel-Crafts catalyst, such as aluminum chloride in solution in an inert low-freezing non-complex forming solvent such as ethyl or methyl chloride, or carbon disulphide or the like, or other dissolved Friedel-Crafts active metal halide to yield high molecular weight polymers ranging in molecular weight from about 2,000 or usually from 20,000 to 250,000 or 500,000 or higher. However, difficulty has been encountered in the polymerization step because of the fact that the polymers, especially the polymers having molecular weights above about 20,000 are semi-solids or solids which tend to adhere to the walls of the reactor, and to cohere into large gummy masses. The polymer is particularly difficult to handle if the polymerization is allowed to approach completion without the presence of large quantities of diluent. Also, suitable diluents are limited in number, and the presence of diluents, especially in large proportions modifies the reaction toward superior products.

The present invention provides a new type of polymerization process which is particularly suitable for low temperature olefinic polymerization reactions; and especially suitable for continuous polymerization reactions.

The invention consists broadly in the steps of cooling an olefinic reactive material to a relatively low temperature, which, for an elastomer, is preferably within the range between about —40° C., and —110° C., although temperatures down to —164° C., may be used within the scope of the present invention; and polymerizing the material by the aid of a dissolved Friedel-Crafts catalyst. The olefinic mixture (usually including appropriate diluents) may be prepared in any convenient way, under pressure if desired to permit mixing at room temperature, or at reduced temperatures to permit mixing at atmospheric pressure. In either event, the olefinic mixture is cooled in standard type heat exchangers to the desired polymerization temperature, usually near to the temperature of boiling ethylene, and the cold mixture is delivered to the polymerizer where the desired low temperature is maintained during the polymerization reaction, preferably, by a refrigerating jacket around the reactor and circulating paths for the reaction mixture. The cold reaction mixture is strongly circulated through one or more draft tubes and one or more return ducts or annular return conduits by the application of a powerful stirring propeller.

It is of the essence of the present invention that a very powerful turbulent stirring effect shall be obtained. This powerful stirring effect markedly reduces the rate of build-up of adherent, fouling, polymer on the reactor walls, and at the same time the rapid traverse of the solution distributes the added catalyst solution quite thoroughly into the olefinic material, and the high turbulence gives a rapid and thorough dispersion of catalyst into the reactant olefinic material before the polymerization reaction is completed. The polymerization reaction is so very rapid, occurring in fractions of a second, that only the most rapid stirring and most powerful turbulence are effective.

It may be noted that the velocity of flow in the draft tube in the reactor must lie above 8 or 10 ft. per second, and preferably be at least 13 ft. per second, up to 20 or 25 ft. per second. It is also desirable that the Reynolds' number for turbulence in the draft tube shall be at least 2,500,000, and preferably well above 3,000,000, up to about 4,500,000. It is found to be highly important that this speed of traverse and high turbulence be obtained with a minimum power input, through the agency of careful streamlining of the reactor and propeller, reliance being placed upon the normal propeller stirring action to produce both the speed of traverse and the turbulence. This limitation is due to the fact that substantially all of the power input to the stirring propeller appears as heat, equivalent to the mechanical energy, all of which must be removed from the reactor by refrigeration. Accordingly, it is found that the stirring energy can rarely be below about 30 H. P. per thousand gallons of reactor contents, and it may rise to as much as 100 H. P. per thousand gallons of reactor volume.

A continuing supply of cold olefinic material, preferably but not necessarily, including a diluent, is delivered to a reaction zone in which the stirring occurs. Simultaneously, a stream of liquid catalyst is supplied to the reaction zone under conditions of rapid, powerful stirring and high turbulence as above described, and an overflow of polymer slurry is taken out of the reactor and discharged to a tank containing warm liquid such as water to vaporize the diluent and unreacted olefins, and convert the slurry into a water slurry of polymer.

The stirring is preferably obtained by means of a stirring propeller within the reaction zone. Alternatively, however, a centrifugal pump circulating means may be used or other well-known means.

The invention consists broadly of a polymerization process which may be conducted in a reactor in the form of a draft tube and a circulation duct or conduit and circulating means surrounded by an auxiliary container spaced away from the reactor duct, and providing space for a jacket of refrigerant. The reactor includes one or more draft tubes equipped with powerful circulating means; and connected return flow conduits such as tubes or annular spaces for the return circulation of the reaction mixture. The structure is partly or wholly surrounded by an outer container filled with a refrigerant which provides a refrigerating jacket, surrounding at least a substantial portion of the circulating system, and preferably surrounding both the draft tube and the return conduits. The circulating means may be a screw propeller positioned within the draft tube, or may be a centrifugal type impeller, located at an end of the draft tube so that the mouth of the draft tube forms the entrance of the centrifugal impeller, or may be a turbine type of impeller (especially if an annular return conduit is used, with the turbine type blades driving the circulation upward through the annular return conduits, with suction, aided by other turbine blades from the mouth of the draft tube and from the end chambers in the polymerizer shell), or may be a high capacity centrifugal pump or other type of pump outside of the reactor, depending upon the efficiency of the polymerizing system in maintaining a fluid slurry. The reactor also is equipped with an inlet connection for delivering the polymerizable olefinic mixture thereto; equipped with another inlet for supplying the polymerization catalyst to the olefinic mixture; and is equipped with an outlet for the polymerized material.

Thus, by the use of an appropriate amount of diluent, together with rapid turbulent stirring and adequate provision for heat transfer, it is possible to obtain simultaneously a very rapid distribution and dispersion of catalyst into the olefinic material, an excellently uniform temperature throughout the cold mixture, a uniform, stable, small particle slurry of solid polymer in diluent, and a marked reduction in the rate at which fouling polymer builds up on the inner-reactor surfaces, thereby obtaining a markedly superior polymer of more uniform molecular weight, a more easily operated reactor and longer run-lengths from the lower rate of fouling.

Thus, the process of the invention provides a rapid circulation of reactive material, which intermingles the catalyst into the reactive mixture with a previously unobtainable speed and efficiency; simultaneously insures a rapid heat transfer of the heat of reaction to the refrigerant in the refrigerating jacket, thereby maintaining a uniformly low reaction temperature, and insuring a narrower molecular weight range in the resulting polymer; and simultaneously causes the polymer to assume the form of a finely granular slurry in the diluent, as well as reducing the fouling rate. The resulting polymerizate mixture is particularly easy to handle for further processing. Other objects and details of the invention will be apparent from the following description when read in connection with the accompanying drawings; wherein Figure 1 is a view, partly in section, of the reactor of the invention, together with associated supply and discharge receivers;

Figure 2 is a view, in vertical section, of the polymerization reactor;

Figure 3 is a view, in horizontal section, on the lines III—III, of Figure 1;

Figure 4 is a top view of the embodiment of Figure 1;

Figure 5 is a side view, in vertical section, of an alternative embodiment.

Figure 1:
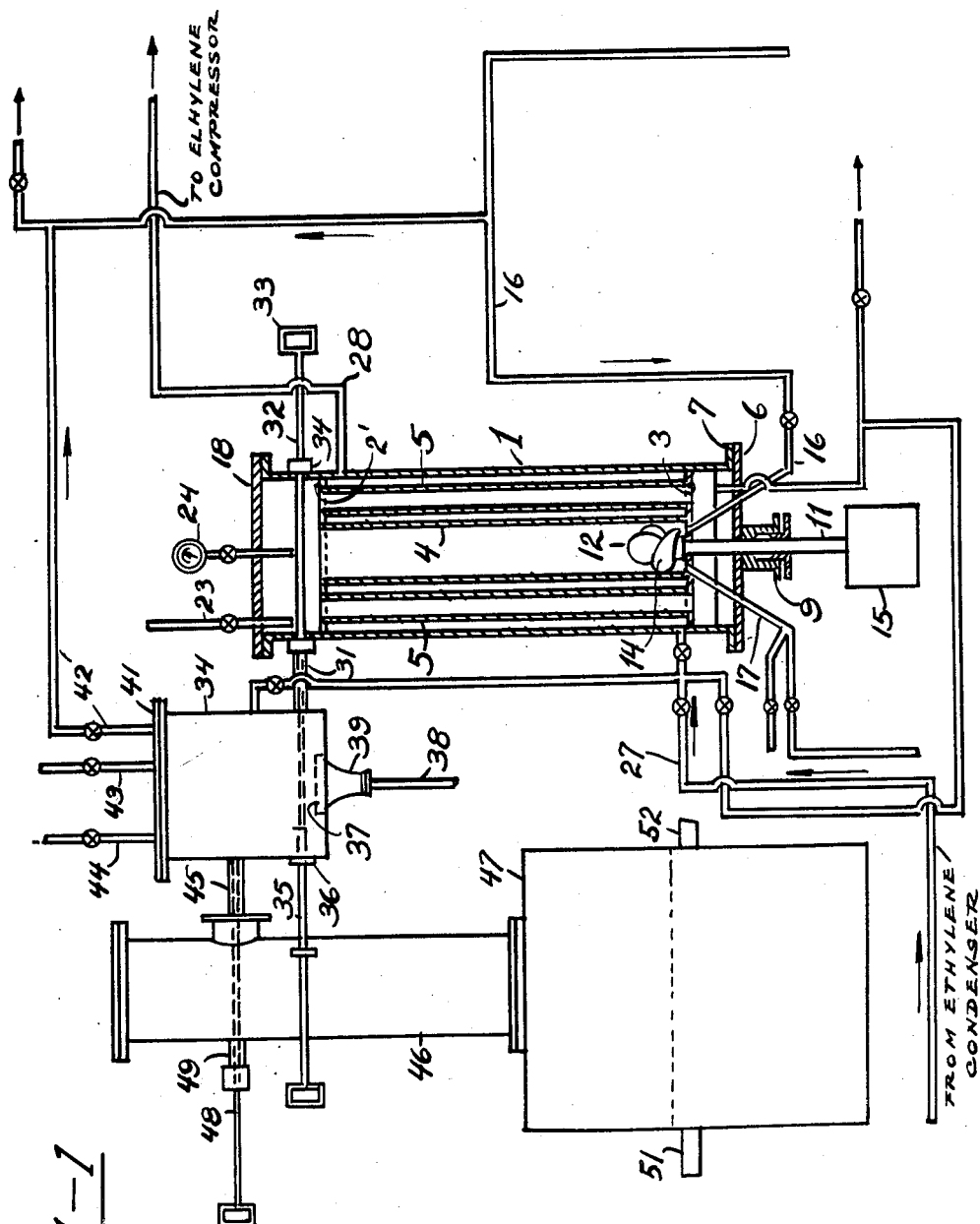

Referring to the figures, particularly Figures 1 and 2, the reactor consists of a shell member 1 within which are positioned an upper header member 2 and a lower header member 3. Between the header members 2 and 3 there is positioned a central draft tube 4, and a series of return circulation tubes 5. At the bottom of the shell member 1 there is provided a closure member 6, consisting of a plate member held to the flange 7 by bolts 8; the flange being attached to the shell 1, preferably, by welding. The closure plate 6 carries a packing gland structure 9, through which a shaft 11 passes. The shaft 11 carries on its upper end a streamlined hub member 12, to which are attached propeller blades 14, positioned as shown in Figures 1 and 2, just above the lower end of the central draft tube 4. The shaft 11 is driven by a power source 15 which may be a pulley and belt drive, or may be a directly connected electric motor, or may be a gear box driven by some convenient source of power. The bottom plate member 6 likewise carries a supply pipe member 16 through which the olefinic material or mixture to be polymerized is introduced to the reactor; and a second supply pipe member 17 through which the polymerization catalyst is introduced.

At the upper end of the reactor there is provided a top header member 18 which also is carried upon a flange 19 and held in place by bolt members 21. The upper closure plate member 19 carries handle members 22 for convenience in removing the cover. The cover closure member 19 also carries a bleeder valve outlet 23 and a pressure gauge 24. A liquid refrigerant inlet 27 is provided near the header 3 passing through the shell member 1, and a volatilized refrigerant outlet 28 is provided at the top of the shell 1 near the header 2. The polymer outlet member 31 is attached to the shell 1 above the upper header 2 as shown in Figure 1.

The outlet pipe 31 is connected directly to a receiver member 34. The receiver 34 is equipped with a stirrer 37 carried upon a power driven shaft 38 which passes through the gland member 39 attached to the bottom of the receiver 34. A removable cover plate 41 is also provided for the recever 34 in which there are carried a vent line 42, and ethylene gas supply and exhaust lines 43 and 44. A polymer outlet pipe 45 is likewise provided at about mid-point in the receiver 34. The outlet or discharge pipe line 45 leads to a dome member 46 which is attached to a recovery tank 47. The recovery tank 47 is provided with an inlet 51 for the treating liquid which may be water or alcohol solution, or naphtha or other convenient fluid; and is provided with an outlet 52, through which the recovered slurry is discharged for further processing.

An alternative embodiment of the invention is shown in Figure 5; in this instance a similar central draft tube 64 being provided within a shell member 61 which carries headers 62 and 63 between which a considerable number of similar return tubes 65 are positioned. This construction also utilizes a propeller within the central draft tube, similar to the propeller of Figures 1 and 2, and is similarly equipped with inlet and discharge tubes for the olefinic mixture, the catalyst, the refrigerant, and the other necessary elements indicated in Figures 1 and 2. In this embodiment the structure is preferably assembled from sheet steel with welded reinforcements.

If desired, the return tubes 5 may be replaced by an annular return conduit which may consist of a pair of concentric tubes, the inner one spaced away from the draft tube 4 by a sufficient distance to provide an auxiliary refrigerating jacket, the outer one being spaced inward, far enough from the shell member 1 to provide the outer refrigerating jacket, or only the latter, larger, tube may be used, dispensing with the refrigerating jacket between the draft tube 4 and the annular return ducts. This construction has the advantage of a larger return area, and the further advantage of an annular space, in which the swirl of the propeller action may continue in the production of high turbulence in the annular return, which is less easy to obtain with separate small tubes, since the tubes tend strongly to straighten out the flow of liquid into a smooth stream.

In the operation of this device a supply of refrigerant which preferably is liquid ethylene is delivered through the pipe line 27 to the refrigerant jacket within the shell 1, and allowed to boil within the shell until a temperature between about −90° C. and the boiling point of liquid ethylene at −103° C., is reached; the gaseous volatilized ethylene being discharged through the pipe 28 and returned to the ethylene compressor for reuse. When the reactor is brought down to the desired low temperature, the olefinic reactants are introduced through the pipeline 16. These reactants may consist of pure isobutylene without other materials, or may consist of other pure isoolefins or other pure olefins such as 2-methyl butene-1, or it may even be the simple butenes, pentenes, heptenes, or various of the 2-methyl substituted compounds. Alternatively, the reactant charge delivered through the supply line 16 may consist of mixtures of an appropriate olefin or isoolefin with a suitable diluent such as ethyl or methyl chloride, or propyl chloride, or ethylene dichloride or chloroform or methylene dichloride, or other mono or polysubstituted aliphatics having less than about 7 carbon atoms.

The reactant mixture may consist of an isoolefin such as isobutylene with a diolefin such as butadiene, or a substituted butadiene having from 4 to 12 or 14 carbon atoms per molecule, or a tri-ene such as myrcene, either as the simple mixture of an isoolefin and polyolefin, or the mixture of isoolefin and polyolefin with a diluent as above indicated. Particularly useful as the multiolefin in this reaction, in addition to the butadiene, are such multiolefins as isoprene, which is the commercially preferred material, or dimethyl butadiene; any of the isomers being useful, but the 2-3 dimethyl butadiene 1-3 being the preferred form, or dimethallyl, which is non-conjugated, or myrcene which is a tri-olefin, are excellent multiolefinic copolymerizates. Similarly usable are such compounds as 2-methyl, 3-butyl, butadiene 1-3, or 2-methyl, 3-nonyl, butadiene 1-3. It is not, however, necessary that the substituents be upon the 2 and 3 carbon atoms of butadiene, since 2-methyl pentadiene 1-3, or 2-methyl pentadiene 1-4 are excellently operative. As a general rule, a substituted butadiene having a methyl group on the 2-carbon and the unsaturation conjugated, polymerizes more nearly in the proportion in which it is present in the polymerization mixture with isobutylene than do other substituted butadienes. However, tests show that substantially any of the multiply-unsaturated hydrocarbons are copolymerizable without regard to the configuration.

Highly valuable polymers may also be produced by the present process from mixtures of isobutylene with styrene in the presence of a diluent, in which the styrene may be present in the proportion of 20% to 80%, the remainder being isobutylene, the preferred range being from 40% to 65% styrene. Such polymers are not strictly elastomers, although they are plastic polymers of excellent tensile strength and are very valuable for many purposes.

The olefinic mixture is preferably cooled to a temperature of approximately −103° C., before it is delivered to the reactor through the line 16, preferably in a standard heat exchanger as above outlined, the first cooling being preferably obtained by cool water, followed by a second cooling with liquid ammonia and a final cooling by liquid ethylene. The reactor may be filled completely full, leaving no more than negligible bubbles beneath the cover plate 18 or it may be filled to the overflow level as desired. The propeller assembly 11—12—14, is then put into operation to produce a rapid circulation of the reactant mixture through the central draft tube 4 and returned through the cooling tubes 5.

At this stage, the delivery of the Friedel-Crafts catalyst through the tube 17 is begun. The catalyst, preferably, is a solution of a Friedel-Crafts type catalyst, such as aluminum chloride or the like, as indicated in the article on "Friedel-Crafts Synthesis" by N. O. Calloway, published in Chemical Reviews, volume 17, No. 3, in 1935, being the article beginning on page 327, the list being particularly well shown on page 375. For catalyst solvent there is conveniently utilized a mono or poly-halogenated alkyl solvent having less than about 5 carbon atoms per molecule; or carbon disulphide, or the like.

For the catalyst solvent, the lower alkyl halides are particularly satisfactory, as are also the multiply halo-substituted aliphatics such as methylene dichloride or difluoride, ethylidene chloride or fluoride, chloroform and the like. It may be noted that the freezing points of the catalyst solvent preferably are at, or below 0° C., but it is not necessary that the freezing point be below the polymerization temperature, since catalyst spray technique permits of the delivery of a relatively finely dispersed stream of catalyst solution into the cold polymerizate mixture into which it dissolves quite readily, partly from the liquid condition and partly from the solid condition. It is desirable, however, that the freezing point be not too greatly different from the polymerization temperature, since the greater the difference, the slower the solution. However, for the catalyst solvent, it is only necessary that there shall be a significant amount of active metal halide substance dissolved, at least 0.01%, that the catalyst solvent shall have a freezing point below about 0° C., and the catalyst solvent must be noncomplex forming with the metal halide; that is, it must be possible to distill from the catalyst solution and instill to the catalyst solution portions of solvent with only minor changes in boiling temperature, such as follow the changes in osmotic pressure; in general it is required only that the catalyst solvent be completely removable from the metal halide without significant change in boiling point or character of solution.

The catalyst inlet may be located at the bottom of the reactor, near the propeller, to discharge the catalyst into a zone of high turbulence, or it may be located at the top, where another zone occurs, in either of which it is rapidly and intimately distributed and dispersed into the reactant mixture.

The polymerization does not begin with the introduction of the first drop of catalyst solution, but a definite threshold concentration of catalyst solution must be obtained before the polymerization starts, depending upon the character of the material making up the initial filling of the reactor (whether it is straight normal feed, or a modified feed, or a residue filling from a reactor in which a run is being discontinued). The polymerization then begins and a slurry of solid polymer is formed. The character and stability of this slurry is, to a considerable extent, determined by the character and amount of diluent present, the presence and amount of catalyst poisons present in the mixture, the speed of traverse of the material in the reactor, and the amount of turbulence present. It may be noted that unavoidable impurities in the form of butene-1 and butene-2 occur in traces in the feed, and there are in addition, significant traces of other materials such as moisture and other hydroxy compounds which form complexes with the catalyst. All of these impurities must be absorbed as complexes with aluminum chloride before any polymerization occurs. Accordingly, the amount of catalyst which must be added and the time which elapses depends to a considerable extent upon the amount of impurities present. Furthermore, since the determination of the amounts of such impurities is an exceedingly difficult and troublesome laboratory operation, it is not commercially feasible to determine them, for which reason the normal stream of catalyst is delivered to the reactor and allowed to continue until polymerization occurs. The beginning of polymerization is marked by a noticeable increase in temperature of the reactor contents (that is, a change in temperature difference between the refrigerating jacket temperature and the reactor contents).

The occurrence and recognition of this temperature phenomenon is markedly accentuated by the strong stirring. Furthermore, the maintenance of a stable slurry depends in part upon the proportion of diluent. To produce a slurry, it is, of course, essential that the polymer be relatively, or nearly, insoluble in the reactor contents. However, the polymer is quite readily soluble in liquid isobutylene and is quite readily solvated by liquid isobutylene. Accordingly, it is found that with methyl or ethyl chloride as diluent, the reactor contents must contain from 70 to 92 or 93% halogenated diluent to obtain a satisfactory stable slurry. With ethylidene fluoride the diluent percentage may be considerably lower, since ethylidene fluoride shows almost a zero solvent power for the polymer, whereas both ethyl and methyl chloride slightly dissolve and slightly solvate the polymer.

The stability of the polymer also is enhanced by the rapid stirring and turbulence, which are effective in producing a more uniform particle size which shows less tendency to coalesce.

Also, the high stirring speed and high turbulence markedly reduce the rate at which polymer adherent to the inner surfaces of the reactor is formed, and accordingly, by the high turbulence and rapid stirring, very markedly increased run lengths between cleaning operations are obtainable.

As above pointed out, the velocity of flow of the polymerizate mixture—slurry—must be above 8 or 10 feet per second, preferably 13 feet per second or above. Likewise, as above stated, it is highly desirable that the Reynolds' number for turbulence in the draft tube shall be at least 2,500,000, and preferably 3,400,000 to 3,500,000. It is likewise desirable that these speeds and Reynolds' numbers be obtained with a minimum power input to the reactor, not exceeding about 90 H. P. per thousand gallons of reactor volume, preferably being within the range between 30 and 50 H. P. per thousand gallons, in order to limit the amount of heat liberated by mere mechanical stirring.

It may be noted that with a 2 ft. diameter draft tube in a 5 x 27 ft. high (internal dimensions) reactor, a propeller speed on a 2 ft. diameter propeller of from 425 and 600 R. P. M., will yield values within this range, and obtain a circulation rate within the draft tube of approximately 20,000 gallons per minute, with a horsepower input within the range between 40 and 60.

It may be noted that the propeller speed will vary according to the diameter of the propeller, and in general it is the peripheral speed of the propeller which governs. If this peripheral speed lies between about 1300 and 1900 feet per minute, a sufficient speed of traverse and turbulence will be obtained, depending to some extent upon the efficiency of the propeller, its pitch and the smoothness of the propeller surfaces. Obviously, a high pitch propeller will yield a more rapid circulation than a low pitch propeller, although the difference is not proportional to the change in pitch.

As the polymerization proceeds, the delivery of further olefinic material is continued and the excess, with the solid polymer suspended therein, as a slurry, is discharged through the pipe 31 to the receiver 34. The slurry then overflows through the pipeline 45 into the dome 46 and is discharged into the recovery tank 47.

If, as is usually desirable, the recovery tank 47 contains warm water, any unpolymerized components are volatilized quickly and returned through the dome 46 and the pipe 45 to the receiver 34 and discharged therefrom, through the discharge pipeline 44 for recovery and further processing. The discharge of the polymerized mixture into water in the recovery tank 47 converts the slurry of polymer in hydrocarbons into an equally fluid slurry of polymer in water, which is readily discharged as a liquid through the pipe 52. The discharged slurry is then filtered to separate the solid polymer from the water, which may be reheated and returned to the recovery tank, while the solid polymer is dried and further processed.

Thus, a stream of cold mixed olefinic material and diluent is delivered to the reactor along with a continuing stream of catalyst solution, and a steady stream of overflow in the form of slurry is obtained. The amount of catalyst required will vary according to the purity of the reactants, the condition of the reactor, the character of the Friedel-Crafts metal halide used (that is, when aluminum chloride is used), its purity and many other factors to the extent that one pound of aluminum chloride will yield from 100 to 2,000 pounds of polymer. However, with reactants and catalyst solvent which are reasonably free from harmful impurities, the amount of polymer obtained per pound of catalyst will usually lie within the range between about 600 pounds and about 950 pounds. Higher yields usually require special purification of all of the reactants and special treatment of the metal halide. The catalyst solution usually will be at least 0.1% of aluminum chloride in methyl chloride—if such are used, although for some purposes considerably lower concentrations are suitable, and the maximum concentration usually is at about 2.5%, since, when higher concentrations are used, the reaction starts before adequate dispersion can be obtained.

The continuing streams of olefinic material in diluent and liquid catalyst are supplied to the reactor, and the temperature drop through the walls of the reactor between the refrigerating jacket and the polymerizate mixture becomes unduly high, indicating an undesirably thick layer of adherent polymer. At the beginning of a run, the temperature drop may be no more than 2°, 3° or 4°. When, however, the temperature drop reaches a value of from 15° to 20°, the polymerization temperature reaches an unduly high value, and poor polymer is produced. When this stage is reached the reactor must be cleaned. Accordingly, the stream of catalyst is interrupted, and after an appropriate time interval, the stream of polymerizate mixture is interrupted or modified, whereafter the reactor may be drained or its contents displaced until the reactor is filled with an appropriate hydrocarbon solvent which removes the fouling polymer from the reactor walls. The reactor may then be replaced on stream by any one of a variety of procedures.

EXAMPLE

A typical operation cycle for a reactor as above described is as follows:

*Operating schedule—Typical run on butyl annular reactor*

| Time | Operation |
| --- | --- |
| 12:00 Noon | With methyl chloride recycle gas on reactor, ethylene is introduced to the reactor head drums at maximum rate allowed by compressor load. |
| 12:15 p. m. | Ammonia chilled recycle feed, approximately 6% isobutylene in methyl chloride, is introduced to the reactor when the ethylene temperature at the bottom of the lower jacket reaches −120° F. Feed rate is set sufficiently low to assure complete chilling (−145° F.) of jackets before reactor is completely filled. |
| 12:15 p. m. | Ethylene refrigeration is put on feed stream. |
| 1:15 p. m. | Methyl chloride recycle gas pressuring line at top of reactor is blocked off and overflow to flash drum is opened. |
| 1:15 p. m. | Agitator is started which maintains a circulation rate of about 20,000 G. P. M. in the 5' x 27' reactor. |
| 1:20 p. m. | Switch is made to blended feed consisting of 25% hydrocarbon with 3.0 B Number (percent isoprene on total hydrocarbon in feed) and 75% methyl chloride diluent. |
| 1:50 p. m. | Sufficient isoprene is added to reactor from special isoprene charge drum to increase B Number of reactor at time of catalyst injection to equilibrium B-Number of running reactors. Reactor is flushed with blended feed at rate of 5,400 lbs./hr. for 20 minutes. |
| 2:10 p. m. | Catalyst is introduced at rate of 1,600 lbs./hr. Catalyst consists of a 0.2-0.4% solution of aluminum chloride in purified methyl chloride and is chilled to about −100° F. before injection into reactor. |
| 2:10 p. m. | Feed rate is raised in steps to 10,500 lbs./hr. without changing catalyst rates. Ethylene evolution rate indicates start and rate of reaction. |
| 2:40 p. m. to 1:00 p. m. of following day. | During reactor run catalyst addition rate is adjusted between 400 and 1200 lbs./hr. to control the conversion, which in turn controls the Mooney viscosity of the reaction product as in inverse function of conversion. Production rate is approximately 2,000 lbs./hr. at a conversion of approximately 76%. The reaction is exothermic and practically instantaneous forming a slurry, the temperature of which is maintained at −140° to −120° F. through ethylene refrigeration. |
| 1:00 p. m. | Reactor run is ended by terminating catalyst flow. Runs may be terminated because of reactor fouling which shows up as overload on agitator motor, excessively high slurry temperature, −115° F. overflow plugging. Most runs are ended voluntarily prior to the formation of excessive fouling deposits since excessively fouled reactors are more difficult to clean. |
| 1:05 p. m. | Ethylene is dumped from reactor jackets and head drums to ethylene dump drum reactor. |
| 1:05 p. m. | Reactor is flushed with warm dilute recycle feed at a rate of 5,000 lbs./hr. |
| 5:00 p. m. | Reactor temperature is now at +50° F., flushing is discontinued and feed and discharge lines are blocked. |
| 5:00 p. m. | Reactor contents are pressured to the flash drum using hot recycle methyl chloride gas pressure. |
| 6:30 p. m. to 8:00 p. m. | Reactor is given a Varsol rinse for 1½ hours with circulating Varsol at 130-150° F. |
| 8:00 p. m. | Varsol sample is checked for rubber content and when found to contain less than 1 wt. percent rubber; reactor is considered to be clean and no further rinsing is necessary. |
| 8:00 p. m. | Agitator is stopped. |
| 8:00 p. m. to 8:30 p. m. | Varsol is pressured from reactor through feed manifold using methyl chloride pressure and feed lines are left open until thoroughly dry. Maintain methyl chloride pressure on reactor for new cycle of operations. |

As above indicated, a convenient refrigerant for the apparatus and process of this invention is liquid ethylene, at atmospheric pressure, since this gives a temperature of approximately −103° C., which is convenient and advantageous for the reaction. Many other refrigerants are, however, available and satisfactory. In some instances, where a moderately high molecular weight only is desired, liquid propane is suitable as a refrigerant, operating under atmospheric pressure. If a somewhat lower temperature is desired, the refrigerating jacket may be operated under reduced pressure, in which case temperatures of almost any desired lowness may be obtained. Other suitable refrigerants for this purpose are ammonia, especially under reduced pressure, carbon dioxide, which is useful only when temperatures higher than about −78° C. are desired, since lower temperatures would cause the carbon dioxide to solidify in the jacket and complicate the operating procedure. Alternatively, also, such refrigerants as liquid ethane or liquid methane are useful; and if the temperatures resulting from such refrigerants are lower than desired, they are conveniently used under conditions of elevated pressure to raise the boiling point. Thus, the structure of the invention is particularly advantageous, because of the very ready control of the polymerization temperature.

The preferred embodiment hereinabove disclosed uses a single central draft tube and an annular return tube, all positioned between headers. This, however, is not the only suitable embodiment, nor is it necessary for the practice of the process herein disclosed. Alternatively, the return circulating tubes may be connected directly to opposite ends of the central draft tube, in which event the headers are dispensed with. Also, it is not necessary that a single draft tube only be used, but a plurality of draft tubes, each equipped with circulating means, may likewise be used, either positioned between headers to which the circulation return tubes are also connected, or merely cross-connected by any convenient means with the return tubes connected directly to opposite ends of the draft tubes.

Also, it is not necessary that a propeller type circulating means be used. Instead, one of the headers may take the form of the intake of a centrifugal circulating pump with the liquid discharged to a manifold to which the return circulating tubes are connected. Alternatively, simple manifolds may be used in place of the headers, the whole being mounted in an appropriately shaped jacketing container. Likewise, other types of circulating pumps may be used, including vane pumps of various types and even piston pumps, although these are less desirable because of lubricating difficulties and the danger of clogging. The return circulating tubes are preferably made as small as possible, but large enough to avoid serious danger of clogging from the polymer.

Thus, the device of the invention provides an efficient polymerization reactor in the form of a draft tube with circulating means for the rapid dispersal of the catalyst into the reaction mixture, together with return circulating tubes, all positioned within a refrigerating jacket for the rapid and efficient removal of the heat of reaction and the maintenance of the character of the polymer in the form of a fine-grained slurry. The invention also resides in the process of circulating an olefinic reaction mixture at a relatively high rate of speed through subdivided tubes for a rapid removal of heat of reaction; and the simultaneous rapid dispersal of catalyst into the reaction mixture; and the maintenance of the produced polymer in the form of a fine-grained slurry which remains fluid and non-adherent to the reactor surfaces.

Thus, the device of the invention provides a convenient polymerization reactor containing a highly efficient refrigerating jacket, surrounding a circulating system, in which the polymer is caused to precipitate in the form of a fluid slurry by the interaction of a low temperature, a nearly or completely filled reactor, and a rapid stirring means.

This application is a continuation-in-part of my prior filed application, Serial No. 448,575, filed June 26, 1942, and abandoned July 28, 1949, and my copending application, Serial No. 106,632, filed July 25, 1949.

While there are above disclosed but a limited number of embodiments of the device of the invention, it is possible to produce still other embodiments without departing from the inventive concept herein disclosed, and it is, therefore, desired that only such limitations be imposed upon the appended claims as are stated therein or required by the prior art.

The invention claimed is:

1. A polymerization process comprising the steps in combination of preparing a cold mixture of a major proportion of isobutylene with a minor proportion of a multiunsaturated hydrocarbon having from 4 to 14, inclusive, carbon atoms per molecule and having at least two aliphatic unsaturated linkages, at a temperature within the range between −40° C. and −110° C.; diluting the mixture with from 1 to 20 volumes of inert diluent which is a non-solvent for the polymer; circulating the cold olefinic-diluent mixture at a flow velocity within the range between 8 feet and 25 feet per second, simultaneously producing therein a Reynolds' turbulence number within the range between 2,500,000 and 4,500,000, and polymerizing the mixture by the addition thereto of a liquid catalyst, thereby causing the polymerization to occur under such conditions of flow rate and turbulence as to yield a fine-grained slurry of solid polymer in diluent with a minimum amount of polymer removed from the slurry by adhesion to container walls.

2. A polymerization process comprising the steps in combination of preparing a cold mixture of a major proportion of isobutylene with a minor proportion of isoprene, at a temperature within the range between −40° C. and −110° C.; diluting the mixture with from 1 to 20 volumes of inert diluent which is a non-solvent for the polymer; circulating the cold olefinic-diluent mixture at a flow velocity within the range between 8 feet and 25 feet per second, simultaneously producing therein a Reynolds' turbulence number within the range between 2,500,000 and 4,500,000, and polymerizing the mixture by the addition thereto of a liquid catalyst, thereby causing the polymerization to occur under such conditions of flow rate and turbulence as to yield a fine-grained slurry of solid polymer in diluent with a minimum amount of polymer removed from the slurry by adhesion to container walls.

3. A polymerization process comprising the steps in combination of preparing a cold mixture of a major proportion of isobutylene with a minor proportion of styrene at a temperature within the range between −40° C. and −110° C.; diluting the mixture with from 1 to 20 volumes of inert diluent which is a non-solvent for the polymer; circulating the cold olefinic-diluent mixture at a flow velocity within the range between 8 feet and 25 feet per second, simultaneously producing therein a Reynolds' turbulence number within the range between 2,500,000 and 4,500,000, and polymerizing the mixture by the addition thereto of a liquid catalyst, thereby causing the polymerization to occur under such conditions of flow rate and turbulence as to yield a fine-grained slurry of solid polymer in diluent with a minimum amount of polymer removed from the slurry by adhesion to container walls.

4. A polymerization process comprising the steps in combination of preparing a cold mixture of a major proportion of isobutylene with a minor proportion of a multi unsaturated hydrocarbon having from 4 to 14, inclusive, carbon atoms per molecule and having at least two aliphatic unsaturated linkages at a temperature within the range between —40° C. and —110° C.; diluting the mixture with from 1 to 20 volumes of inert diluent which is a non-solvent for the polymer; circulating the cold olefinic-diluent mixture at a flow velocity within the range between 8 feet and 25 feet per second, simultaneously producing therein a Reynolds' turbulence number within the range between 2,500,000 and 4,500,000, and polymerizing the mixture by the addition thereto of a liquid catalyst, comprising aluminum chloride in solution in a low freezing, non-complex forming solvent, thereby causing the polymerization to occur under such conditions of flow rate and turbulence as to yield a fine-grained slurry of solid polymer in diluent with a minimum amount of polymer removed from the slurry by adhesion to container walls.

5. A polymerization process comprising the steps in combination of preparing a cold mixture of a major proportion of isobutylene with a minor proportion of a multi unsaturated hydrocarbon having from 4 to 14, inclusive, carbon atoms per molecule and having at least two aliphatic unsaturated linkages, at a temperature within the range between —40° C. and —110° C.; diluting the mixture with from 1 to 20 volumes of inert diluent which is a non-solvent for the polymer; circulating the cold olefinic-diluent mixture at a flow velocity within the range between 8 feet and 25 feet per second, simultaneously producing therein a Reynolds' turbulence number within the range between 2,500,000 and 4,500,000, and polymerizing the mixture by the addition thereto of a liquid catalyst, comprising aluminum chloride in solution in methyl chloride in a proportion between 0.01% and 2.5%, thereby causing the polymerization to occur under such conditions of flow rate and turbulence as to yield a fine-grained slurry of solid polymer in diluent with a minimum amount of polymer removed from the slurry by adhesion to container walls.

6. A polymerization process comprising the steps in combination of preparing a cold mixture of a major proportion of isobutylene with a minor proportion of an unsaturated hydrocarbon selected from the group consisting of a multi-unsaturate having from 4 to 14, inclusive, carbon atoms per molecule and having at least two aliphatic unsaturated linkages and styrene, at a temperature within the range between —40° C. and —110° C.; diluting the mixture with from 1 to 20 volumes of inert diluent which is a non-solvent for the polymer; circulating the cold olefinic-diluent mixture at a flow velocity within the range between 8 feet and 25 feet per second, simultaneously producing therein a Reynolds' turbulence number within the range between 2,500,000 and 4,500,000, and polymerizing the mixture by the addition thereto of a liquid catalyst, thereby causing the polymerization to occur under such conditions of flow rate and turbulence as to yield a fine-grained slurry of solid polymer in diluent with a minimum amount of polymer removed from the slurry by adhesion to container walls.

7. A polymerization process comprising the steps in combination of preparing a cold mixture of a major proportion of isobutylene with a minor proportion of a conjugated diolefin having from 4 to 6, inclusive, carbon atoms per molecule, at a temperature within the range between —40° C. and —110° C.; diluting the mixture with from 1 to 20 volumes of inert diluent which is a non-solvent for the polymer; circulating the cold olefinic-diluent mixture at a flow velocity within the range between 8 feet and 25 feet per second, simultaneously producing therein a Reynolds' turbulence number within the range between 2,500,000 and 4,500,000, and polymerizing the mixture by the addition thereto of a liquid catalyst, comprising aluminum chloride in solution in a low freezing, non-complex forming solvent, thereby causing the polymerization to occur under such conditions of flow rate and turbulence as to yield a fine-grained slurry of solid polymer in diluent with a minimum amount of polymer removed from the slurry by adhesion to container walls.

JOHN H. BANNON.

REFERENCES CITED

The following references are of record in the file of this patent:

UNITED STATES PATENTS

| Number | Name | Date |
|---|---|---|
| 2,436,767 | Gerlicher | Feb. 24, 1948 |
| 2,465,363 | Faragher | Mar. 29, 1949 |
| 2,474,592 | Palmer | June 28, 1949 |